March 17, 1942.  K. W. DAVIS  2,276,939
LUBRICATED PISTON VALVE
Filed April 15, 1940
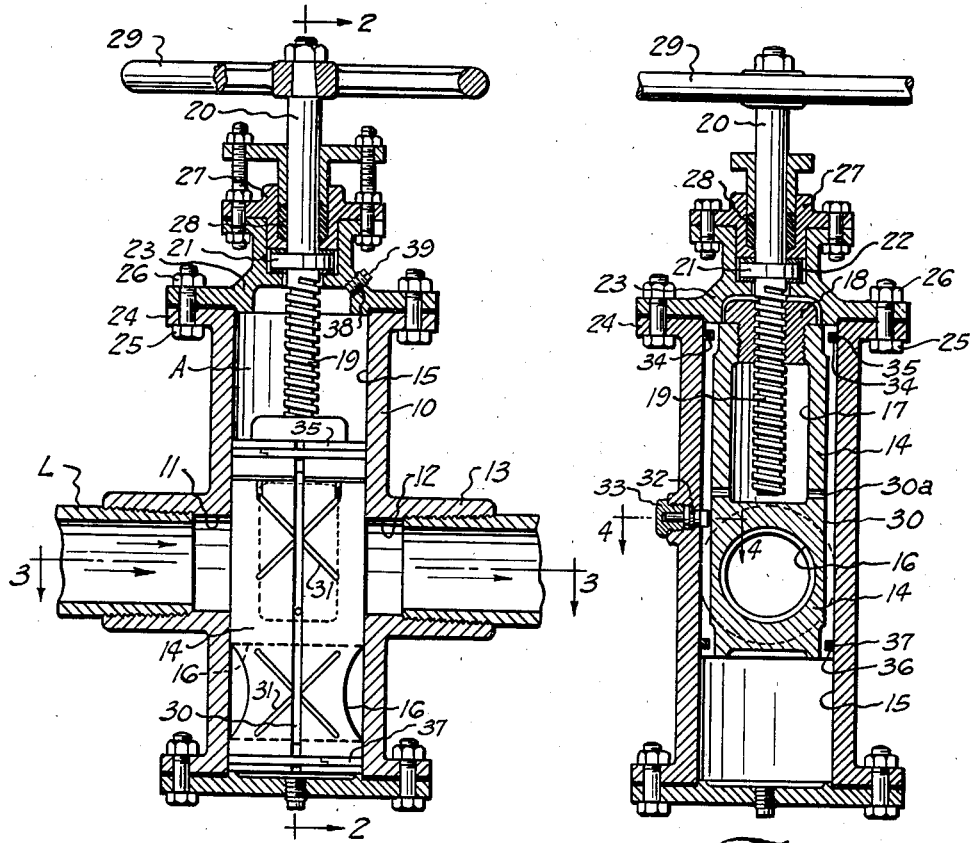
Fig. 1.
Fig. 2.
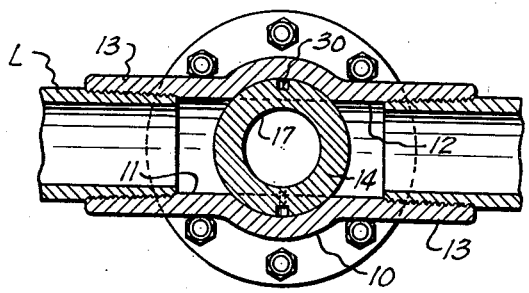
Fig. 3.
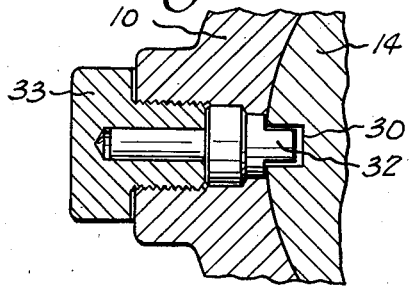
Fig. 4.
Inventor
Kenneth W. Davis
By Jack A. Ashley
Attorney Patented Mar. 17, 1942

2,276,939

UNITED STATES PATENT OFFICE 2,276,939

LUBRICATED PISTON VALVE

Kenneth W. Davis, Fort Worth, Tex.

Application April 15, 1940, Serial No. 329,771

1 Claim. (Cl. 251—20)

This invention relates to new and useful improvements in lubricated piston valves.

One object of the invention is to provide an improved valve of the piston type, which is provided with means for lubricating the exterior thereof and which is particularly adapted for use in controlling the flow of fluid under pressure.

An important object of the invention is to provide an improved valve having a reciprocable piston therein which is arranged to control the flow through the valve, said piston having an improved arrangement of grooves and channels, whereby a lubricant may be confined within the cylinder in which the piston operates and will serve to efficiently lubricate substantially the entire exterior surface of the piston without interfering with, or effecting the movement of, said piston.

Another object of the invention is to provide an improved lubricated piston valve, wherein piston rings are mounted on said piston for retaining the lubricant within the cylinder, together with means for utilizing the pressure of the lubricant for urging the rings into their sealing position during movement of the piston, whereby escape of the lubricant from, or admittance of the controlled fluid flowing through the valve into the cylinder is prevented.

A particular object of the invention is to provide an improved lubricated piston valve, which is so constructed that the pressure of the fluid flowing through the line in which the valve is connected, is utilized to assist in moving the valve from one position to another, whereby the disadvantage of the line pressure acting against one side of the piston and tending to bind the same and thereby interfere with its movement, is overcome.

Still another object of the invention is to provide an improved valve, of the character described, which is simple in construction, economical in manufacture and efficient in operation.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is a view, partly in section and partly in elevation, of a valve constructed in accordance with the invention and showing the piston in a lowered or shut-off position, Figure 2 is a transverse, sectional, view of the valve, taken on the line 2—2 of Figure 1, with the piston in a raised position permitting flow through the valve, Figure 3 is a horizontal, cross-sectional view, taken on the line 3—3 of Figure 1, and Figure 4 is an enlarged, horizontal cross-sectional view, taken on the line 4—4 of Figure 2.

In the drawing, the numeral 10 designates a valve body which is generally cylindrical in cross-section so as to provide a cylinder A. Diametrically opposed openings or ports 11 and 12 are formed in the wall of the body 10 and communicate with the interior thereof. A collar 13, which is preferably made integral with the body 10 surrounds each opening and is internally screw-threaded, whereby the body may be connected in a flow line L.

The direction of flow through the line L is as shown by the arrows in Figure 1 and for controlling the flow through the valve body a non-rotatable piston 14 is slidable within the bore 15 of the cylinder A. This piston is provided with a diametrically extending passage 16 which has a diameter substantially equal to the diameter of the openings 11 and 12. When the piston 14 is in its lowered position, as shown in Figure 1, the passage 16 is misalined with the openings 11 and 12, whereby a flow through the valve and through the line L is prevented. When the piston 14 is moved to its raised position, as shown in Figure 2, the passage 16 of said piston registers with the openings 11 and 12 to provide a continuous passage through the valve body and thereby permit an uninterrupted flow through the line L.

For imparting movement to the piston 14, the upper end of said piston is formed with an internal cavity 17 which has its open upper end adapted to be closed by a cap 18 which is threaded thereinto. An elongate worm screw 19 is threaded through the cap 18 and said screw is formed integral with an operating stem 20. An annular flange 21 is preferably formed integral with the stem and screw and is confined within a chamber 22 which is formed within a flanged closure 23. As is fully shown in Figures 1 and 2, the flange of the closure 23 overlies an annular external flange 24 which is provided on the upper end of the body 10 and suitable bolts 25 and nuts 26 fasten the flanges to each other. For confining the annular flange or ring 21 which is formed on the stem within the chamber 22, a packing gland 27 is bolted to the upper end of the closure 23. This gland not only confines the flange 21 within the chamber 22 but also provides for the reception of a packing member or ring 28, which packs off around the stem 20.

With the above arrangement, it will be evident that the screw 19 is capable of a rotation and yet, is confined against vertical movement within the cylinder A. When the worm screw 19 is rotated, the non-rotatable piston 14 will be reciprocated within the bore 15 of the cylinder and thus, opening and closing of the valve may be controlled. The extreme upper end of the stem 20 may be provided with a suitable hand wheel 29 to facilitate the manual rotation of the worm screw 19.

In order to lubricate the external surface of the piston 14, said piston is formed with a pair of diametrically opposed grooves or channels 30, which extend entirely throughout the length thereof. Inclined grooves or recesses 31 are disposed at the upper and lower ends of the piston on each side thereof and these grooves extend outwardly from the grooves 30, as is clearly shown in Figure 1. Intermediate its ends, each groove 30 communicates with the interior of the cavity 17 for the purposes of admitting and releasing fluids from the cavity upon the entrance and removal of the worm screw to and from said cavity, due to raising and lowering of the piston within the cylinder. One of the grooves 30 receives an inwardly directed pin or lug 32 which is mounted in the wall of the cylinder and which is retained therein by a suitable plug 33. Manifestly, the lug rides within the groove in all positions of the piston and co-acts with the groove to prevent rotation of the piston within said cylinder, whereby rotation of the worm screw imparts reciprocation to the piston.

The extreme upper end of the piston is provided with an annular recess or channel 34 which is arranged to receive an upper piston ring 35. A similar recess 36 is formed at the lower end of the piston and receives a piston ring 37. As is fully shown in Figure 2, the vertical grooves 30 extend from the top to the bottom of the piston and that portion of each groove 30 which is adjacent to the piston rings 35 and 37 is slightly enlarged so that a flow of fluid behind said piston rings may occur.

In the operation of the valve, a suitable lubricant, such as oil, is introduced into the cylinder A through an opening 38 which is provided in the closure 23 and which is normally closed by a plug 39. This lubricant which is introduced into the cylinder will flow downwardly through the vertical grooves 30 and into the space below the piston. The lubricant will also enter the various inclined recesses 31 and will also flow into the cavity 17 through the openings 30a, which establish communication between the cavity and the vertical grooves 30. Sufficient lubricant is placed within the cylinder to entirely fill said cylinder, as well as the grooves and recess, and the cavity 17.

Assuming that the valve is in a closed position, the piston 14 is lowered or in the position shown in Figure 1. At this time the lubricant is in the upper end of the cylinder A above the piston and is also within the grooves 30, recesses 31 and cavity 17. At this time, the line pressure is acting on the upstream side of the piston and is tending to urge the piston into tight engagement with the wall of the cylinder adjacent the downstream side of the line. When it is desired to open the valve, the hand wheel 29 is rotated to rotate the worm screw 19 in a direction which will cause upward movement of the piston 14. As the piston 14 moves upwardly, the lubricant in the cylinder thereabove is placed under a pressure and said lubricant is forced downwardly through the vertical or longitudinal grooves 30, flowing downwardly therethrough to the underside of the piston. Obviously the lubricant flowing through the grooves 30 will act against the inner side of the piston rings 35 and 37 and will hold the same in their outer or sealing position in tight engagement with the wall of the cylinder A, whereby an escape of the lubricant from the cylinder is prevented. As the piston moves upwardly, the lubricant is forced to the underside thereof and during this time the line pressure is at all times acting against the upstream side of the piston. This pressure will tend to flow upwardly between the wall of the cylinder and the external surface of the piston and into the space above said piston. However, since the lubricant within the upper end of the cylinder A is under a pressure due to the fact that the cylinder is moving upwardly, such pressure on the lubricant will prevent the admission of the line pressure into the cylinder at this point. The line pressure is also tending to flow downwardly between the cylinder wall and the piston and since this line pressure is greater than the pressure beneath the piston, the line pressure will escape into the space below said piston and will aid in urging the piston upwardly to an open position. Thus, it will be seen that the line pressure is utilized to assist the worm screw 19 in moving the valve toward an open position and said line pressure does not in any way interfere, but rather assists, in the operation of said piston.

When the piston has moved to its uppermost position, as shown in Figure 2, and the passage 16 therein registers with the openings 11 and 12, a free flow of fluid through the valve may occur. By this time, the liquid lubricant within the cylinder has by-passed to the underneath side of the piston, a portion of said lubricant being within the grooves 30, as well as within the inclined recesses 31 and cavity 17. It will be apparent that the disposition of the recesses 31, as well as of the grooves 30, is such that substantially the entire area of the piston which contacts the wall of the cylinder on each side of the openings 11 and 12 is provided with a lubricant and thus the exterior of the piston is sufficiently lubricated at all times. The piston rings will prevent the escape of the lubricant from within the cylinder and into the flow line L.

When it is desired to close the valve, the piston is moved downwardly to the position shown in Figure 1. During such movement, the lubricant below the piston is placed under a pressure because obviously the lubricant is restricted in its escape to the upper end of the cylinder because of the restricted area of the grooves 30. The lubricant being under pressure below the piston during the downward movement thereof prevents the line pressure from acting on the lower end of said piston to resist the lowering movement thereof. However, the cylinder above the piston during the downward movement thereof is at a pressure less than the line pressure and such line pressure may enter the upper end of the cylinder and act downwardly thereon to assist in moving the valve to its closed position.

From the above, it will be seen that a simple and efficient piston valve is provided. The lubricating grooves are arranged so as to substantially lubricate the entire area of the piston and said lubricant also serves as a seal between the piston and the cylinder wall. The arrangement of the piston rings 35 and 37 is such that the lubricant is utilized to urge the rings outwardly into their sealing position. The pressure within the flow line L does not interfere with the operation of the piston but actually assists or aids in moving said piston from one position to another.

The foregoing description of the invention is explanatory thereof and various changes in the size, shape and materials, as well as in the details of the illustrated construction may be made, within the scope of the appended claim, without departing from the spirit of the invention.

What I claim and desire to secure by Letters Patent is:

A valve of the character described including, a housing having a flow channel and a bore intersecting said channel, a piston slidable in said bore and having a passage adapted for registration with the flow channel to permit a flow therethrough, said piston having grooves in its exterior surface which establish communication between the upper and lower ends of the housing on opposite sides of the piston, and means for introducing a lubricant into the housing, whereby said lubricant enters the grooves and lubricates the exterior wall of said piston.

KENNETH W. DAVIS.